Feb. 23, 1926.
H. WHITE
1,574,719
FISHING REEL
Filed May 19, 1925.
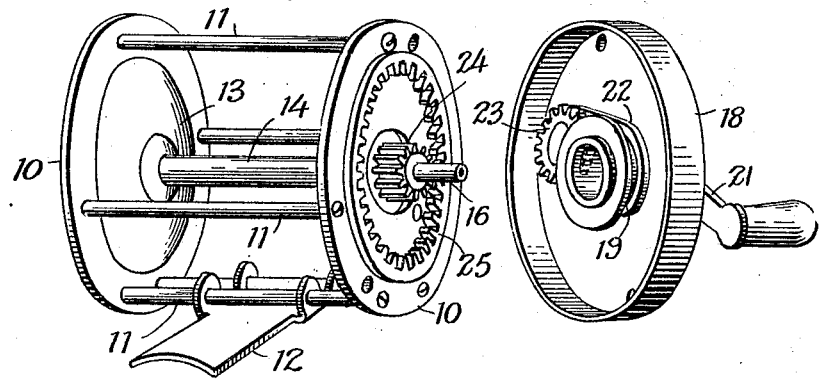
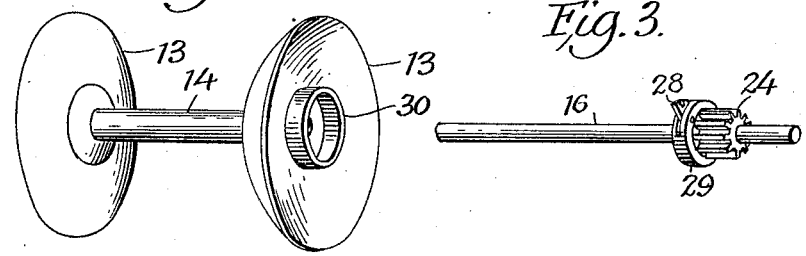
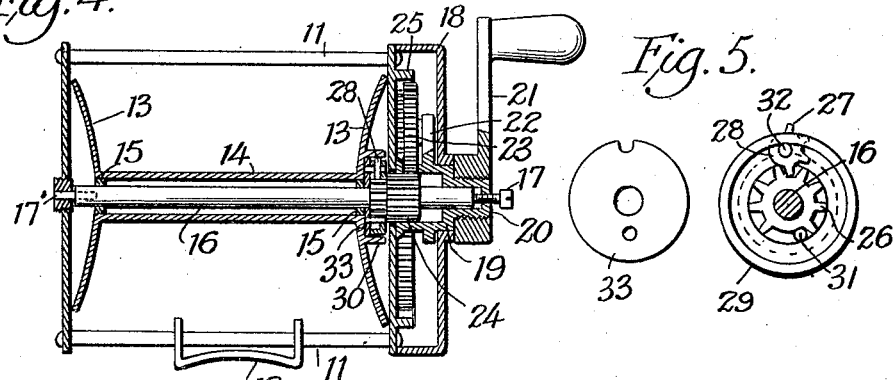
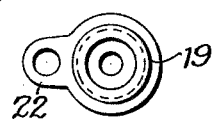

Patented Feb. 23, 1926.

1,574,719

UNITED STATES PATENT OFFICE.

HERBERT WHITE, OF HANOVER, ILLINOIS.

FISHING REEL.

Application filed May 19, 1925. Serial No 31,322.

*To all whom it may concern:*

Be it known that I, HERBERT WHITE, a resident of Hanover, in the county of Jo Daviess, State of Illinois, a citizen of the United States, have invented certain new and useful Improvements in Fishing Reels, of which the following is a specification.

This invention relates to fishing reels and especially where independent action is required so that the reel may be free to pay out the line when it is cast or may be engaged by a handle and rotated in the reverse direction, so that the line may be rewound.

The object of the invention being to provide said winding handle with an arm to carry a planetary gear wheel meshing with a stationary gear wheel and driving a pinion concentric with the handle hub and adapted to operate a clutch when driven for the winding operation but adapted to release the clutch and reel when the line is cast.

Another object of the invention is to compactly locate the said gearing and clutch at one end of the reel within very little space so that the whole device shall not seem heavy nor cumbersome.

These and other objects and details of the invention are more fully described in the following specification, set forth in the appended claims and illustrated in the accompanying drawings, wherein:

Figure 1 is a perspective view of the improved reel with its end casing removed.

Fig. 2 is a perspective view of the spool detached.

Fig. 3 is a perspective view of the shaft with pinion and clutch.

Fig. 4 is a longitudinal sectional view.

Fig. 5 is a side view of the clutch and its cover.

Fig. 6 is a side view of the arm adapted to carry the planetary gear wheel.

The improved fishing reel consists of a frame having the heads 10 connected by cross bars 11, the lower ones carrying a plate 12 by which the reel may be attached to a fishing rod.

Within this frame is enclosed a spool upon which the line is adapted to be wound and comprising heads 13 preferably convex as opposed to each other and connected by a tube 14 having interior bearings 15 at each end and in which is located the shaft 16 supported by pins 17 and 17' at each end, the pin 17 being threaded and adjustable to prevent too free movement of the shaft and to take up wear.

To one of the heads 10 is secured a casing 18 and mounted concentrically in the same is a shell 19 having a threaded boss 20 extending beyond the outside of the casing and on which is secured the handle 21 that is adapted to rotate the shell.

Extending radially from the shell is an arm 22 carrying the gear wheel 23 that plays through an opening in the side of the shell and meshes with the pinion 24 secured on the shaft. The wheel 23 also gears with the internally toothed ring 25 on the adjacent head 10, and as the handle 21 is turned and the wheel 23 carried by the arm 22 around the toothed ring 25, said wheel 23 is rotated and in turn rotates the pinion 24 and shaft 16.

As the shaft and pinion are rotated clockwise by the handle a small mutilated gear 26 (Fig. 5) on the shaft 16 is partly rotated and throws outward a spur 27 of the clutch 28 that is pivoted in a drum 29 adjacent the pinion 24, and the said spur engages the interior of the clutch band 30 on the adjacent spool head 13 and rotates the spool to wind on the line.

The movement of the drum 29 on the shaft 16 is limited by a pin 31 that allows sufficient shifting of the parts to operate the clutch and throw it out or in. This pin and the pivot pin 32 of the clutch member serve also to unite to the drum a plate 33 to confine the parts.

When the reverse movement is given the spool by the paying out of the line the initial action of the spool throws the clutch 28 around with its mutilated gear 26 and the band 30 is unobstructed and free to move while the handle 21 remains at rest.

The casing 18 is secured to its head 10 by screws that permit of immediate removal or replacing so that repairs may be made when desired and the parts quickly assembled.

It is obvious that the parts may be otherwise arranged or modified without departing from the essential features above described or from the scope of the appended claims.

What I claim as new is:

1. In a fishing reel the combination of a frame and its casing and a rotatable bearing shell in the casing having a gear-arm and gear thereon, a shaft journaled in the frame and shell and a pinion on the shaft, a spool on the shaft, a clutch band on the spool and a clutch member on the shaft, means on the shaft for disengaging the clutch members when the shaft is moved in one direction, a handle fixed to the shell for rotating the latter to engage the clutch members, and multiplying gears between said pinion and gear.

2. In a fishing reel, the combination of a frame having a casing at one end, a shaft journalled in the casing and the frame, a spool having heads and mounted on the shaft, a clutch band on one of the heads, a clutch member on the shaft, means on the shaft for throwing the clutch member in or out of engagement according to the direction of rotation of the shaft, a handle outside of the casing and concentric with the shaft, a gear wheel on the frame, a pinion on the shaft, and a planetary gear between said gear wheel and the pinion and operated by the handle.

3. In a fishing reel, the combination of a frame having a casing at one end, a shaft journaled in the frame and casing, a mutilated gear on the shaft, a drum adapted to revolve about said mutilated gear, a pin on the drum and engaging said gear to limit the drum's movement, a clutch member having teeth to mesh with the mutilated gear and adapted to be thrown in or out of gear as the drum revolves, a clutch drum on the spool, a pinion on the shaft, a shell about the pinion and journalled in the casing, a handle to the shell to rotate it, a radial arm on the shell, an internally toothed gear wheel on the frame, and a gear wheel carried by the arm and meshing with the internally toothed wheel and the pinion to drive the latter as the handle is turned.

In testimony whereof I hereunto affix my signature.

HERBERT WHITE.